United States Patent [19]

Falla et al.

[11] Patent Number: 5,525,659
[45] Date of Patent: Jun. 11, 1996

[54] BATCH INCLUSION PACKAGES

[75] Inventors: Daniel J. Falla, Sarnia; Debbie-Lee Walker, Brights Grove, both of Canada

[73] Assignee: The Dow Chemical Company, Midland, Mich.

[21] Appl. No.: 118,065

[22] Filed: Sep. 8, 1993

[51] Int. Cl.[6] .................................................. C08K 5/17
[52] U.S. Cl. .................... 524/257; 524/418; 524/420; 524/425; 524/432; 524/445; 526/348.1; 526/348.2; 526/348.3; 526/348.4; 526/348.5; 526/348.6
[58] Field of Search .............................. 526/348.1, 348.3, 526/348.2, 348.4, 348.5, 348.6; 524/445, 257, 418, 420, 425, 432

[56] References Cited

U.S. PATENT DOCUMENTS

| | | | |
|---|---|---|---|
| 3,645,992 | 2/1972 | Elston | 260/80.78 |
| 4,076,698 | 2/1978 | Anderson et al. | 526/348.6 |
| 4,248,348 | 2/1981 | Butler et al. | 206/447 |
| 4,334,615 | 6/1982 | Butler et al. | 206/447 |
| 4,378,067 | 3/1983 | Butler et al. | 206/447 |
| 4,394,473 | 7/1983 | Winter et al. | 524/226 |
| 5,120,787 | 6/1992 | Drasner | 524/524 |
| 5,272,236 | 12/1993 | Lai et al. | 526/348.5 |
| 5,278,272 | 1/1994 | Lai et al. | 526/348.5 |

FOREIGN PATENT DOCUMENTS

| | | |
|---|---|---|
| 2053051 | 4/1993 | Canada . |
| 0076521 | 4/1983 | European Pat. Off. . |
| 0270902 | 6/1988 | European Pat. Off. . |
| 0292007A3 | 11/1988 | European Pat. Off. . |
| 93/08221A2 | 4/1993 | WIPO . |
| 94/09060A1 | 4/1994 | WIPO . |

OTHER PUBLICATIONS

"New Rules for ethylene α-olefins interpolymers: controlled rheology polyolefins (CGCT)", ANTEC, 1993.
"Compatibag," published by Presto Products, Inc., Sep. 1, 1982.
"Compatibag," published by Presto Products, Inc., Oct. 17, 1983.
"Plastic Bags/Films In Chemical Handling," by Joseph Drasner, presented at Southern Rubber Group, Inc., Winter Technical Session, Savannah, Georgia, Feb. 20, 1992.
"Progressive Packaging," Foodservice And Hospitality, Jul., 1992, pp. 17–19.
"Bancroft & Klein, Inc. Introduces New Plastic Bags For Hazardous and Hard–To–Hold Products," Bancroft & Klein, Inc (1986).
"Canadian Firm Offers Disappearing Packaging Material," Business And The Environment, Mar., 1992, vol. 3, No. 4, p. 14.
"Winning Entry Goes To Bonar," Canadian Packaging, Issue N11, p. 11. (1991).
"This Converter Produces Innovative Shipping Sacks," Paper Film and Foil Converter, 1989, 63, (4), 57, 58.
"The Environmental Answer Is In The Bag," published by The Dow Chemical Company, Mar., 1992.

*Primary Examiner*—David W. Wu

[57] ABSTRACT

Batch inclusion packages made from films and film structures are disclosed. The films and film structures have at least one layer of at least one substantially linear ethylene/α-olefin polymer. The batch inclusion packages are useful in wrapping or containing various materials, such as carbon black, titanium dioxide, and rubber compounding ingredients.

12 Claims, No Drawings

BATCH INCLUSION PACKAGES

CROSS-REFERENCE TO RELATED APPLICATIONS

This application is related to application Ser. No. 07/776,130, filed Oct. 15, 1991; now U.S. Pat. No. 5,272,335 to application Ser. No. 07/939,281 filed Sep. 2, 1992 now U.S. Pat. No. 5,278,272 and to application Ser. No. 08/024,563 filed Mar. 1, 1993, now abandoned. The disclosures of each of the foregoing patent applications are incorporated by reference herein in their entirety.

FIELD OF THE INVENTION

This invention relates to batch inclusion packages made from compositions comprising specific ethylene/α-olefin polymers. The packages are made from films and are used to contain and protect powders, pellets and flowable materials, wherein the entire package (i.e., film and contents) can be added to a mixture during production of a product, e.g., placing the package into the extruder/mixer simultaneously with the contained product.

The compositions comprise at least one substantially linear ethylene/α-olefin polymer having specific characteristics.

BACKGROUND OF THE INVENTION

Batch inclusion packages are widely used to contain materials such as carbon black, titanium dioxide powder, elastomers (rubbers), polystyrene pellets and other chemicals. The batch inclusion packages minimize dust health hazards and possible fire hazards, as well as waste, since the entire package and its contents are processed during use of the contents. The batch inclusion package has numerous requirements when used in such a manner. These include compatibility with the material to be contained, low melting temperature, a narrow softening range, and extrudability.

U.S. Pat. No. 4,248,348 (Butler et al.) discloses a package comprising an article (such as an unvulcanized rubber) packaged in a film. The film is made from an ethylene/vinyl acetate copolymer containing an antiblock agent. U.S. patent '348 teaches that polyethylene film is not suitable for overwrapping bales of rubber, because when the bale (including the film wrapper) is charged into a suitable mixer, the polyethylene film is not sufficiently dispersed and causes defects in the end product.

Similarly, U.S. Pat. No. 5,120,787 (Drasner) discloses a method of compounding a rubber by using a bag or liner made from an ethylene/vinyl acetate copolymer. The bag or liner is directly compounded into the mixer and becomes part of the rubber compound.

U.S. Pat. No. 4,394,473 (Winter et al.) discloses packages comprising an article (e.g., unvulcanized or vulcanized rubber) packaged in a bag made from syndiotactic 1,2-polybutadiene containing an antiblock additive. U.S. patent '473 also teaches that the use of polyethylene bags results in incompatibility problems.

EPA 0 270 902 (The Dow Chemical Company) discloses the use of bags made from copolymers of at least one olefin monomer (e.g., ethylene) and acrylic or methacrylic acid, or ionomers thereof, used to package particulate elastomer materials.

Branched, high pressure low density polyethylene (LDPE) and blends of LDPE with small amounts of traditional (i.e., Ziegler polymerized) linear low density polyethylene (LLDPE), typically less than 10 percent LLDPE, are sometimes used to make batch inclusion bags which are used to contain carbon black. The carbon black is then used to make tires. However, the melting and softening characteristics of LDPE limits its use as a batch inclusion packaging material.

Use of traditional LLDPE in batch inclusion is also severely limited because of its relatively high melting point and broad softening range.

We have now discovered that a new class of polyethylene overcomes the difficulties associated with use of traditional LDPE and LLDPE in batch inclusion packaging materials.

SUMMARY OF THE INVENTION

Substantially linear ethylene polymers have now been discovered to be useful in packaging various articles for use in batch inclusion applications. In accordance with the invention, a package is provided which comprises (A) an ingredient used to make an article using heat and/or shear packaged in (B) a protective film comprising at least one layer of at least one substantially linear ethylene/α-olefin polymer, wherein the protective film (B) becomes part of the final article comprising the ingredient (e.g., by melting or shearing).

The substantially linear ethylene/α-olefin polymer is characterized as having:

a) a melt flow ratio, $I_{10}/I_2$, $\geq 5.63$, b) a molecular weight distribution, $M_w/M_n$, defined by the equation: $M_w/M_n \leq (I_{10}/I_2) - 4.63$, and c) a critical shear rate at onset of surface melt fracture of at least 50 percent greater than the critical shear rate at the onset of surface melt fracture of a linear ethylene/α-olefin polymer having about the same $I_2$ and $M_w/M_n$.

The substantially linear ethylene/α-olefin polymers can also be further characterized as having:

d) a processing index (PI) less than or equal to about 70% of the PI of a linear ethylene/α-olefin polymer having about the same $I_2$ and $M_w/M_n$.

The substantially linear ethylene/α-olefin polymers are not "linear" polymers in the traditional sense of the term, as used to describe linear low density polyethylene, nor are they highly branched polymers, as used to describe low density polyethylene. Surprisingly, however, the substantially linear ethylene/α-olefin polymers have the processability similar to highly branched low density polyethylene, but the strength in toughness of linear low density polyethylene.

DETAILED DESCRIPTION OF THE INVENTION

The term "substantially linear" ethylene/α-olefin polymer means that the polymer backbone is substituted with about 0.01 long chain branches/1000 carbons to about 3 long chain branches/1000 carbons, more preferably from about 0.01 long chain branches/1000 carbons to about 1 long chain branches/1000 carbons, and especially from about 0.05 long chain branches/1000 carbons to about 1 long chain branches/1000 carbons.

Long chain branching is defined herein as a chain length of at least about 6 carbons, above which the length cannot be distinguished using $^{13}C$ nuclear magnetic resonance spectroscopy. The long chain branch can be as long as about the same length as the length of the polymer back-bone.

Long chain branching is determined by using $^{13}$C nuclear magnetic resonance (NMR) spectroscopy and is quantified using the method of Randall (*Rev. Macromol. Chem. Phys.,* C29 (2&3), p. 285–297), the disclosure of which is incorporated herein by reference.

The substantially linear ethylene/α-olefin polymers and interpolymers of the present invention are herein defined as in copending application Ser. No. 07/776,130 filed Oct. 15, 1991 and in copending application Ser. No. 07/939,281 filed Sep. 2, 1992. The substantially linear ethylene/α-olefin polymers are preferably copolymers, but can also be interpolymers. The term "interpolymer" is used herein to indicate a copolymer, or a terpolymer, or the like. That is, at least one other comonomer is polymerized with ethylene to make the interpolymer.

The substantially linear ethylene/α-olefin copolymers and interpolymers are homogeneously branched, i.e., the comonomer is randomly distributed within a given interpolymer molecule and substantially all of the interpolymer molecules have the same ethylene/comonomer ratio within that interpolymer.

The substantially linear ethylene/α-olefin polymers for use in the present invention are interpolymers of ethylene with at least one $C_3$–$C_{20}$ α-olefin and/or $C_4$–$C_{18}$ diolefins. Preferred comonomers include the $C_3$–$C_{20}$ α-olefins especially propene, isobutylene, 1-butene, 1-hexene, 4-methyl-1-pentene, and 1-octene. Copolymers of ethylene and 1-octene are especially preferred.

The term "linear ethylene/α-olefin copolymers" means that the olefin copolymer does not have long chain branching. That is, the linear ethylene/α-olefin copolymer has an absence of long chain branching, as for example the linear low density polyethylene polymers or linear high density polyethylene polymers made using uniform branching distribution polymerization processes (e.g., U.S. Pat. No. 3,645,992 (Elston), the disclosure of which is incorporated herein by reference) in which the comonomer is randomly distributed within a given interpolymer molecule and wherein substantially all of the interpolymer molecules have the same ethylene/comonomer ratio within that interpolymer. The heterogeneously branched Ziegler polymerized linear low density polyethylene polymers disclosed in U.S. Pat. No. 4,076,698 (Anderson et al.), the disclosure of which is incorporated herein by reference, also have an absence of long chain branching and are thus "linear" polymers. The term "linear ethylene/α-olefin polymers" does not refer to high pressure branched (free-radical polymerized) polyethylene which is known to those skilled in the art to have numerous long chain branches.

The peak melting point of the substantially linear homogeneously branched ethylene/α-olefin polymers is determined using differential scanning calorimetry (DSC) in accordance with ASTM D 3417-83 with the following exceptions: a sample weight of from 2–10 mg, a helium or nitrogen conditioning medium, a first heat from 30°–200° C. at a rate of about 40°–50° C./min, isothermal at 200° C. for 2 minutes, a cooling rate of 15° C./min to 30° C., a sample annealing time from 1 to 24 hours at room temperature (about 30° C.), and a second heat temperature scan from about −10° C. to about 150° C.

Traditional Ziegler polymerized heterogeneously branched ethylene polymers have a high density fraction which have high DSC peaks even with lower density products, as shown in Table 1. The melting point of the substantially linear ethylene/α-olefin polymers is generally from about 50° C. to about 115° C. and is generally related to the polymer density, as also shown in Table 1:

TABLE 1

| Polymer type | Melt index (g/10 min) | Density (g/cm³) | Peak melting point (°C.) | Vicat softening point (°C.) |
|---|---|---|---|---|
| SLEP* | 1 | 0.87 | 56.0 | ≦32 |
| SLEP | 1 | 0.902 | 96.3 | 88.3 |
| SLEP | 1 | 0.9 | 93.4 | 87.1 |
| SLEP | 1 | 0.91 | 103 | 96.8 |
| SLEP | 1 | 0.917 | 109.7 | 101.4 |
| LDPE** | 6.4 | 0.924 | 110.4 | NM |
| LDPE | 1 | 0.922 | 109.8 | NM |
| LDPE | 0.9 | 0.921 | 109.1 | NM |
| LDPE | 0.22 | 0.923 | 111 | NM |
| LDPE | 0.3 | 0.922 | 110.5 | 97.7 |
| LDPE | 0.8 | 0.923 | 113.3 | 97.8 |
| Hetero*** | 0.08 | 0.905 | 121.6 | 81 |
| Hetero | 1 | 0.912 | 121.1 | 94 |
| Hetero | 1 | 0.92 | 121 | 101 |

*SLEP = Substantially linear ethylene/α-olefin polymer
**LDPE = Low density polyethylene
***Hetero = heterogeneously branched polyethylene
NM = Not Measured As the data indicate for the substantially linear ethylene/α-olefin polymers, the lower the density, the lower the melting point. However, the melting point of the heterogeneously branched polyethylene essentially does not vary with density.

The substantially linear ethylene/α-olefin polymer for use in a batch inclusion package application is generally selected based on the processability of the substantially linear ethylene/α-olefin polymer into batch inclusion packaging material and through manufacturing process in which the batch inclusion package is used. For example, a polymer having a density low enough to ensure adequate melting during use is required, but not too low so that the resultant film has too much stretch. The film also must have enough strength and must not soften too much prior to or during the manufacturing process. In addition, a substantially linear ethylene/α-olefin polymer can have a higher $I_{10}/I_2$ value, which can provide a more stable bubble during blown film production of batch inclusion film. The melt index of the substantially linear ethylene/α-olefin polymer also must be selected based on the bubble stability and/or film strength. Selection of a substantially linear ethylene/α-olefin polymer for use in a particular batch inclusion package is thus based on a variety of factors and the foregoing parameters are intended to be illustrative and not limiting.

The melting range of the substantially linear polymer is also relatively narrow, so that the polymer melts quickly when it reaches the appropriate temperature. Generally, the narrow melting range of the polymer is indicated by the difference between the melting point and the softening point. For the substantially linear ethylene/α-olefin polymer, the melting point is relatively close to the Vicar Softening point (typically within about 9°–25° C.) of the polymer, such that the bag does not soften too much during transport and to prevent "strings" of poorly blended/unmelted polymer from forming during use of the bag in the end-user's manufacturing process.

As listed in Table 1, typically for substantially linear ethylene/α-olefin polymer, the Vicat softening point is greater than about 25° C. from the DSC melting point at low melting points (less than or equal to about 56° C.) and low polymer densities (less than or equal to about 0.87 g/cm³) and less than about 9° C. lower than the melting point of at higher melting points (greater than or equal to about 110° C.) and higher polymer densities (greater than or equal to about 0.917 g/ cm³). Traditional LDPE typically has DSC melting points greater than about 100° C., more frequently greater than about 106° C. and have Vicat softening points within 12°–17° C. of their melting points. The moderately high melting points of LDPE limits their usefulness to only a few batch inclusion applications (e.g., to package carbon black for tire production).

Typically, LLDPE has melting points from about 121°–125° C. and softening points within about 20° C. (for LLDPE having a density of about 0.92 g/cm³) and 40° C. (for LLDPE having a density of about 0.905 g/cm³) of their melting point. The high melting point and broad softening point of the traditional LLDPE have severely limited the use of LLDPE in batch inclusion package applications.

Vicat Softening point is measured herein in accordance with ASTM D 1525-87 using 0.125 inch (thick) plaques having a diameter of 1 inch prepared according to ASTM D-1928-90-C. Heating rate B of the ASTM test is used (120±12° C./hour).

The density of the substantially linear ethylene/α-olefin polymers (as measured in accordance with ASTM D-792) for use in the present invention is generally less than about 0.94 g/cm³, preferably from about 0.87 g/cm³ to about 0.92 g/cm³. The density of the substantially linear ethylene/α-olefin polymers used in the present invention is generally dependent upon the processability of the substantially linear ethylene/α-olefin polymer into batch inclusion packaging materials and packages, the strength required of the batch inclusion packaging material, and the manufacturing process in which the batch inclusion package is used. Generally for elastomers, the density of the substantially linear ethylene/α-olefin polymer used to make the batch inclusion package is from about 0.87 g/cm³ to about 0.917 g/cm³.

The molecular weight of the substantially linear ethylene/α-olefin polymers for use in the present invention is conveniently indicated using a melt index measurement according to ASTM D-1238, Condition 190° C./2.16 kg (formerly known as "Condition (E)" and also known as $I_2$). Melt index is inversely proportional to the molecular weight of the polymer. Thus, the higher the molecular weight, the lower the melt index, although the relationship is not linear. The melt index for the substantially linear ethylene/α-olefin polymers useful herein is generally that useful in forming film in conventional film forming manufacturing operations, such as cast film, blown film and extrusion coating techniques. The melt index is generally from about 0.1 grams/10 minutes (g/10 min) to about 20 g/10 min, preferably from about 0.3 g/10 min to about 5 g/10 min.

Another measurement useful in characterizing the molecular weight of the substantially linear olefin polymers is conveniently indicated using a melt index measurement according to ASTM D-1238, Condition 190° C./10 kg (formerly known as "Condition (N)" and also known as $I_{10}$). The ratio of these two melt index terms is the melt flow ratio and is designated as $I_{10}/I_2$. Generally, the $I_{10}/I_2$ ratio for the linear is at least about 5.63, preferably at least about 7, especially at least about 8 or above. For the substantially linear ethylene/α-olefin polymers used in the batch inclusion packages of the invention, the $I_{10}/I_2$ ratio indicates the degree of long chain branching, i.e., the higher the $I_{10}/I_2$ ratio, the more long chain branching in the polymer. Generally, the $I_{10}/I_2$ ratio of the substantially linear ethylene/α-olefin polymers is at least about 5.63, preferably at least about 7, especially at least about 8. Generally, the upper limit of $I_{10}/I_2$ ratio for the homogeneously branched substantially linear ethylene/α-olefin polymers is about 50 or less, preferably about 30 or less, and especially about 20 or less.

The substantially linear ethylene/α-olefin polymers used in the film of the batch inclusion packages are preferably used as the only polymer components. However, other polymers can be blended and/or multilayered extruded and/or multilayered laminated with the substantially linear ethylene/α-olefin polymers to modify the film processing, film stiffness, film barrier properties, film strength, film melting characteristics, or other desirable film characteristics. Batch inclusion films made with appropriate blends of the substantially linear ethylene/α-olefin polymer and other polymer components would still maintain enhanced performance. Some useful polymer blend components include, for example, high pressure low density polyethylene (LDPE), ethylene/vinyl acetate copolymer (EVA), ethylene/vinyl alcohol copolymer (EVOH), polybutylene (PB), linear high density polyethylene (HDPE) having a density from about 0.941 to about 0.965 g/cm³ and heterogeneously branched linear low density polyethylene (LLDPE) having a density from about 0.87 to about 0.94 g/cm³. Preferably the substantially linear ethylene/α-olefin copolymers comprise at least about 50 percent of the blend composition, more preferably at least about 80 percent of the blend composition. Highly preferably, though, the inner layer would consist essentially of at least one substantially linear ethylene/α-olefin polymer.

Other additives such as plasticizers, antioxidants (e.g., hindered phenolics (e.g., Irganox® 1010 made by Ciba Geigy Corp.), phosphites (e.g., Irgafos® 168)), cling additives (e.g., polyisobutylene (PIB)), heat stabilizers, light stabilizers (e.g., Cyasorb™ UV 531 benzophenone made by Cyanamid and Tinuvin™ 622 hindered amine light stabilizer made by Ciba Giegy Corp.), pigments (e.g, titanium dioxide, calcium carbonate, carbon black), processing aids (e.g., polyethylene glycols, fluoropolymers, fluoroelastomers, waxes), flame retardants (e.g., Amgard™ CPC 102 phosphorous based flame retardants made by Albright and Wilson Americas), lubricants (e.g., waxes, stearates, mineral oils), slip agents (e.g., erucamide, oleamide), antiblock additives (e.g, talc, silicon dioxide), cross-linking agents (e.g., peroxides, (e.g., Booster™ made by DuPont)), anti-fogging agents (e.g., Atmer™ 100 sorbitan ester made by ICI), impact modifiers (e.g., Paxon™ Pax Plus rubber modified film resin made by Allied Corp.), antistatic agents (e.g., Armostat 410 ethoxylated tertiary amine made by Akzo Chemicals, Inc.), fillers (e.g, talc, calcium carbonate, clay, fumed silicas), and the like can also be included in the homogeneously branched substantially linear ethylene/α-olefin polymer, to the extent that they do not interfere with the function of the batch inclusion package. The list of additives is merely illustrative and is not all inclusive or limiting.

The "rheological processing index" (PI) is the apparent viscosity (in kpoise) of a polymer measured by a gas extrusion rheometer (GER). The gas extrusion rheometer is described by M. Shida, R. N. Shroff and L. V. Cancio in *Polymer Engineering Science*, Vol. 17, no. 11, p. 770 (1977), and in "Rheometers for Molten Plastics" by John Dealy, published by Van Nostrand Reinhold Co. (1982) on page 97–99, both publications of which are incorporated by reference herein in their entirety. All GER experiments are performed at a temperature of 190° C., at nitrogen pressures between 5250 to 500 psig using a 0.0296 inch diameter, 20:1 L/D die with an entrance angle of 180°. For the polymers described herein, the PI is the apparent viscosity (in kpoise)

of a material measured by GER at an apparent shear stress of $2.15 \times 10^6$ dyne/cm². The novel polymers described herein preferably have a PI in the range of about 0.01 kpoise to about 50 kpoise, preferably about 15 kpoise or less. The novel substantially linear ethylene/α-olefin polymers described herein for use in the batch inclusion packages have a PI less than or equal to about 70% of the PI of a comparative linear ethylene/α-olefin polymer at about the same $I_2$ and $M_w/M_n$.

An apparent shear stress vs. apparent shear rate plot is used to identify the melt fracture phenomena. According to Ramamurthy in *Journal of Rheology*, 30(2), 337–357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular gloss to the more severe form of "sharkskin". In this disclosure, the onset of surface melt fracture (OSMF) is characterized at the beginning of losing extrudate gloss at which the surface roughness of extrudate can only be detected by 40X magnification. The critical shear rate at onset of surface melt fracture for the substantially linear olefin polymers is at least 50 percent greater than the critical shear rate at the onset of surface melt fracture of a linear olefin polymer having about the same $I_2$ and $M_w/M_n$. Gross melt fracture occurs at unsteady flow conditions and ranges in detail from regular (alternating rough and smooth, helical, etc.) to random distortions. The critical shear rate at onset of surface melt fracture (OSMF) and onset of gross melt fracture (OGMF) will be used herein based on the changes of surface roughness and configurations of the extrudates extruded by a GER.

The SCBDI (Short Chain Branch Distribution Index) or CDBI (Composition Distribution Branch Index) is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, in Wild et al, *Journal of Polymer Science, Poly. Phys. Ed.*, Vol. 20, p. 441 (1982), or in U.S. Pat. No. 4,798,081, both disclosures of which are incorporated herein by reference. The SCBDI or CDBI for the substantially linear ethylene/α-olefin polymers of the present invention is preferably greater than about 30 percent, especially greater than about 50 percent.

Molecular Weight Distribution Determination

The substantially linear ethylene/α-olefin polymer samples are analyzed by gel permeation chromatography (GPC) on a Waters 150C high temperature chromatographic unit equipped with three mixed porosity columns (Polymer Laboratories $10^3$, $10^4$, $10^{5,}$ and $10^6$), operating at a system temperature of 140° C. The solvent is 1,2,4-trichlorobenzene, from which 0.3 percent by weight solutions of the samples are prepared for injection. The flow rate is 1.0 milliliters/minute and the injection size is 200 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science, Polymer Letters*, Vol. 6, (621) 1968, incorporated herein by reference) to derive the following equation:

$$M_{polyethylene} = a * (M_{polystyrene})^b.$$

In this equation, a = 0.4316 and b = 1.0. Weight average molecular weight, $M_w$, is calculated in the usual manner according to the following formula: $M_w = \Sigma w_i * M_i$, where $w_i$ and $M_i$ are the weight fraction and molecular weight, respectively, of the $i^{th}$ fraction eluting from the GPC column.

For the substantially linear ethylene/α-olefin polymers, the $M_w/M_n$ is preferably from about 1.5 to about 2.5, especially about 2.

The Substantially Linear Ethylene/α-Olefin Polymers

The substantially linear ethylene/α-olefin polymers are made by using suitable constrained geometry catalysts, preferably constrained geometry catalysts as disclosed in U.S. application Ser. Nos.: 545,403, filed Jul. 3, 1990; 758,654, filed Sep. 12, 1991, now U.S. Pat. No. 5,132,380; 758,660, filed Sep. 12, 1991; now abandoned and 720,041, filed Jun. 24, 1991, now U.S. Pat. No. 5,157,788 the teachings of all of which are incorporated herein by reference. The monocyclopentadienyl transition metal olefin polymerization catalysts taught in U.S. Pat. No. 5,026,798, the teachings of which is incorporated herein by reference, are also suitable for use in preparing the polymers of the present invention, so long as the reaction conditions are as specified below.

Suitable cocatalysts for use herein include but are not limited to, for example, polymeric or oligomeric aluminoxanes, especially methyl aluminoxane, as well as inert, compatible, noncoordinating, ion forming compounds. Preferred cocatalysts are inert, noncoordinating, boron compounds.

Polymerization

The improved processibility of the substantially linear ethylene/α-olefin polymers used in the present invention result, it is believed, from their method of production. The polymers may be produced via a continuous (as opposed to a batch) controlled polymerization process using at least one reactor, but can also be produced using multiple reactors (e.g., using a multiple reactor configuration as described in U.S. Pat. No. 3,914,342) at a polymerization temperature and pressure sufficient to produce the interpolymers having the desired properties.

In polymerizing ethylene and ethylene/α-olefin copolymers, a batch reactor process typically operates at an ethylene concentration from about 6.7 to about 12.5 percent by weight of the reactor contents and have a polymer concentration generally less than about 5 percent by weight of the reactor contents, dependent upon the ethylene solubility, which is a function of reactor temperature and pressure.

According to one embodiment of the present process, the polymers are produced in a continuous process, as opposed to a batch process. Preferably, the polymerization temperature of the continuous process is from about 20° C. to about 250° C., using constrained geometry catalyst technology. If a narrow molecular weight distribution polymer ($M_w/M_n$ of from about 1.5 to about 2.5) having a higher $I_{10}/I_2$ ratio (e.g. $I_{10}/I_2$ of 7 or more, preferably at least 8, especially at least 9) is desired, the ethylene concentration in the reactor is preferably not more than about 8 percent by weight of the reactor contents, especially not more than about 6 percent by weight of the reactor contents, and most especially not more than about 4 percent by weight of the reactor contents. Preferably, the polymerization is performed in a solution polymerization process.

Generally, manipulation of $I_{10}/I_2$ while holding $M_w/M_n$ relatively low for producing the novel polymers used herein is a function of reactor temperature and/or ethylene concentration. Reduced ethylene concentration and higher temperature generally produces higher $I_{10}/I_2$. Generally, as the ethylene concentration of the reactor decreases, the polymer concentration increases. For the novel substantially linear ethylene/α-olefin polymers, the polymer concentration for a continuous solution polymerization process is preferably above about 5 weight percent of the reactor contents, especially above about 6 weight percent of the reactor contents.

The polymerization conditions for manufacturing the polymers of the present invention are generally those useful in the solution polymerization process, although the application of the present invention is not limited thereto. Slurry and gas phase polymerization processes are also believed to be useful, provided the proper catalysts and polymerization conditions are employed.

In general, the continuous polymerization according to the present invention may be accomplished at conditions well known in the prior art for Ziegler-Natta or Kaminsky-Sinn type polymerization reactions, that is, temperatures from 0° to 250° C. and pressures from atmospheric to 1000 atmospheres (100 MPa). Suspension, solution, slurry, gas phase or other process conditions may be employed if desired. A support may be employed but preferably the catalysts are used in a homogeneous (i.e., soluble) manner. It will, of course, be appreciated that the active catalyst system, especially nonionic catalysts, form in situ if the catalyst and the cocatalyst components thereof are added directly to the polymerization process and a suitable solvent or diluent, including condensed monomer, is used in said polymerization process. It is, however, preferred to form the active catalyst in a separate step in a suitable solvent prior to adding the same to the polymerization mixture.

Suitable Films and Film Structures

Films and film structures having the novel properties described herein can be made using conventional hot blown film or cast film fabrication techniques. Biaxial orientation processes such as tenter frames or double bubble processes can be used in conjunction with the conventional fabrication techniques. Conventional hot blown film processes are described, for example, in *The Encyclopedia of Chemical Technology*, Kirk-Othmer, Third Edition, John Wiley & Sons, New York, 1981, Vol. 16, pp. 416–417 and Vol. 18, pp. 191–192, the disclosures of which are incorporated herein by reference. Biaxial orientation film manufacturing process such as described in a "double bubble" process as in U.S. Pat. No. 3,456,044 (Pahlke), and the processes described in U.S. Pat. No. 4,865,902 (Golike et al.), U.S. Pat. No. 4,352,849 (Mueller), U.S. Pat. No. 4,820,557 (Warren), U.S. Pat. No. 4,927,708 (Herran et al.), U.S. Pat. No. 4,963,419 (Lustig et al.), and U.S. Pat. No. 4,952,451 (Mueller), the disclosures of each of which are incorporated herein by reference, can also be used to make the novel films and film structures described herein. The films and film structures can also be made as described in a tenter-frame technique, such as that used for oriented polypropylene.

The films may be monolayer or multilayer films, but at least one of the novel substantially linear ethylene/α-olefin polymers described herein is used in at least one layer of the film structure, preferably the inner layer. The inner layer is the layer adjacent to the material contained in the package. The inner layer can be coextruded with the other layer(s) or the inner layer can be laminated onto another layer(s) in a secondary operation, such as that described in "Coextrusion For Barrier Packaging" by W. J. Schrenk and C. R. Finch, *Society of Plastics Engineers RETEC Proceedings*, Jun. 15–17 (1981), pp. 211–229, the disclosure of which is incorporated herein by reference. A monolayer film can also be produced via tubular film (i.e., blown film techniques) or flat die (i.e., cast film) as described by K. R. Osborn and W. A. Jenkins in "Plastic Films, Technology and Packaging Applications" (Technomic Publishing Co., Inc. (1992)), the disclosure of which is incorporated herein by reference, and, optionally, the film can go through an additional post-extrusion step of adhesive or extrusion lamination to other packaging material layers to form a multilayer structure. If the film is a coextrusion of two or more layers (also described by Osborn and Jenkins), the film may still be laminated to additional layers of packaging materials, depending on the other physical requirements of the final packaging film. "Laminations Vs. Coextrusion" by D. Dumbleton (Converting Magazine (September 1992), the disclosure of which is incorporated herein by reference, also discusses lamination versus coextrusion. Monolayer and coextruded films can also go through other post extrusion techniques, such as a biaxial orientation process.

Extrusion coating is yet another technique for producing multilayer packaging materials. Similarly to cast film, extrusion coating is a flat die technique. A film layer can be extrusion coated onto a substrate either in the form of a monolayer or a coextruded extrudate.

Generally for a polymer blend and/or a multilayer film structure, the substantially linear ethylene/α-olefin interpolymer or copolymer described herein comprises at least one layer of the total multilayer film structure, preferably the inner layer. Other layers of the multilayer structure include but are not limited to barrier layers, and/or tie layers, and/or structural layers. Various materials can be used for these layers, with some of them being used as more than one layer in the same film structure. Some of these materials include: ethylene/vinyl alcohol (EVOH) copolymers, polyvinylidene chloride (PVDC), polyethylene terepthalate (PET), oriented polypropylene (OPP), high density polyethylene (HDPE), ethylene/vinyl acetate (EVA) copolymers, ethylene/acrylic acid (EAA) copolymers, ethylene/methacrylic acid (EMAA) copolymers, LLDPE, HDPE, LDPE, nylon, graft adhesive polymers (e.g., maleic anhydride grafted polyethylene), and paper. Generally, the multilayer film structures comprise from 2 to about 7 layers.

The thickness of the monolayer film or multilayer film structure is typically from about 0.2 mil to about 15 mils (total thickness), preferably from about 1 mil to about 5 mils. In a coextrusion (or multilayer extrusion), the inner layer comprising the substantially linear ethylene/α-olefin polymer is typically from about 0.2 mils to about 15 mils, preferably from about 1 mil to about 5 mils.

Suitable Batch Inclusion Structures

The films and film structures made from the substantially linear ethylene/α-olefin polymer are made into bags, liners, or wrappers depending on the end use requirements. For example, a tub liner can be used to sequentially blend various ingredients, wherein the contents and the liner are transferred from one tub to another tub for further blending with other components and, optionally, to a high intensity mixer. In another example, an additive used to make rubber can be packaged in a bag; the entire bag, including contents, is not opened, but rather added to the process during production of the rubber. Such batch inclusion bag uses and manufacturing techniques are well known in the industry, as U.S. Pat. No. 4,394,473, U.S. Pat. No. 5,120,787, U.S. Pat. No. 4,248,348, EPA 0 270 902, and CA 2,053,051 all describe.

Use of the novel substantially linear ethylene/α-olefin polymers in batch inclusion bags and films affords numerous advantages. The substantially linear ethylene/α-olefin polymers have excellent processability, as evidenced by comparing Example 1 with comparative example 2 in making blown film (described later in this disclosure) and also have low melting points and softening ranges, relative to heterogeneously branched polyethylene. The substantially linear ethylene/α-olefin polymers are also compatible with a variety of elastomeric additives especially useful in the rubber industry since the substantially linear ethylene/α-olefin polymers comprise carbon and hydrogen atoms, as opposed to use of batch inclusion films and bags made from ethylene/acrylic acid or ethylene/methacrylic acid copolymers (as described in EPA 0 270 902), or as compared with films and bags made from ethylene/vinyl acetate copolymers (as described in U.S. Pat. No. 5,120,787 and U.S. Pat. No. 4,248,348).

The ingredient(s) of the batch inclusion bags (or wrappers or coverings or liners) can be free-flowing (i.e., the ingredient(s) easily flow under their own weight under the force of gravity) or they can be non-flee-flowing (i.e., the ingredient(s) does not flow under its own weight under the force of gravity). The ingredient(s) can vary, but typically includes non-free flowing ingredients such as unvulcanized rubber; non-crosslinked elastomers; and tars.

Typical free flowing ingredients include clay, silicates, calcium carbonate, cadmium diethyldithiocarbanate, tetramethylthiuram disulfide, benzothiazyl disulfide, substituted thio esters and amine type antioxidants, aniline antiozonant derivatives, diamines, and/or thiourea curatives selected from sulfur, sulfur providing compounds and peroxides, ultraviolet agents selected from substituted benzotriazoles and substituted benzophenones, color pigments selected from iron oxide, titanium dioxides and organic dyes, reinforcing pigments selected from carbon black, zinc oxide and hydrated silicon compounds, processing aids such as silicon dioxide, pumice, stearate and rubber processing oils, cross-linked elastomers, compounding ingredients for unvulcanized rubber, ground tires, herbicides, fungicides, and chlorinated polyethylene (CPE). Liquids as well as solids are included in free-flowing ingredients usefully contained within the packages of the invention.

Typically in the rubber industry, a rubber processing oil is used in minor amounts (e.g., from about 0.5 to about 10 weight percent) and mixed together with at least one other compounding ingredient. The ingredients which can be packaged using the novel package of the invention is not all inclusive and is not limited to those listed.

The packages of the invention relate to both bagged or wrapped compounding ingredients, and also to mixtures thereof with additives such as rubber processing oil. In the case of unvulcanized rubber, the film is generally applied around the rubber, especially when in bale form, usually under tension so that it firmly wraps the rubber and then the film is heat sealed against itself to complete the package. Heat sealing the film is desired, but not necessary to form the package.

Articles made from the batch inclusion packages vary according to the type of ingredient contained within the package. Some articles include asphalt, animal feed and wire. For example, in packaging ground tires for production of asphalt, packaging titanium dioxide for the production of animal feed, and packaging CPE for the production of wire coverings, the batch inclusion packages of the invention are used to contain the specific ingredients listed. Other articles include various rubbers (e.g., by packaging rubber or rubber additives in the batch inclusion films described herein). Waste material (e.g., dense tar spillage or waste plastic) can also be packaged for the production of energy by disposing the entire package into an incinerator. Waste plastic and other materials can also be packaged and recycled to form another useful article such as a trash bag or park bench.

Experimental: Cast Film Examples

Table 2 summarizes physical properties of polymers used to make films for use in batch inclusion bag applications:

TABLE 2

| Polymer Designation | Polymer | Melt Index (g/10 min) | Density (g/cm$^3$) | $M_w/M_n$ | $I_{10}/I_2$ |
|---|---|---|---|---|---|
| A | Substantially linear ethylene/ 1-octene copolymer | 1 | 0.87 | 2.1 | 7.1 |
| B | Tafmer ™ PO 480* | 1 | 0.88 | 1.9 | 6.3 |
| C | LDPE | 0.7 | 0.924 | NM | NM |

*a a linear ethylene/propane copolymer made by Mitsui Petrochemical
NM = Not Measured Cast film is made from polymer blends of the polymers described in Table 2 using a 1.5 inch Killion extruder equipped with a 1 inch air gap, an air knife and edge pins on. All percentages are by weight of the final polymer blend. Blends are made by tumbling resin pellets together in a rotating tilted drum. Table 3 summarizes the cast film production data:

TABLE 3

|  | 85% B 15% C* | 85% A 15% C | 100% A | 100% B* |
|---|---|---|---|---|
| Zone 1 (°F.) | 325 | 325 | 304 | 300 |
| Zone 2 (°F.) | 349 | 350 | 351 | 351 |
| Zone 3 (°F.) | 375 | 375 | 375 | 375 |
| Clamp ring (°F.) | 400 | 400 | 400 | 400 |
| Adapter (°F.) | 400 | 400 | 401 | 400 |
| Die 1 (°F.) | 400 | 400 | 398 | 401 |
| Die 2 (°F.) | 400 | 400 | 400 | 400 |
| Die 3 (°F.) | 397 | 388 | 399 | 400 |
| Melt temp. (°F.) | 395 | 388 | 385 | 391 |
| Amps | 16.4 | 15.0 | 15.7 | 15.4 |
| Screw RPM | 30 | 30 | 30 | 34 |
| Pressure (psi) | 4000 | 2900 | 3300 | 4350 |
| Motor setting | 35.3 | 35.4 | 35.4 | 38.3 |
| Cast roll setting | 8 | 8 | 9 | 9 |
| Nip roll setting | 8 | 8 | 9 | 10 |
| Chiller (°F.) | 5 | 5 | 5 | 5 |
| Film gauge (mils) | 5 | 5 | 5 | 5 |
| Output rate (lb/hr) | NM | NM | 8.6 | 8.8 |
| Screen pack | none | none | 20/60** | 20/60** |

NM = Not Measured
*Comparison example
**20/60 = adjacent screens at 20 and 60 mesh The results show that materials A and B both process reasonably well on the cast line used. However, they have different processing characteristics upon extrusion. Under the conditions studied, the polymer blend of B and C required more power (amps) than did the polymer blend of A and C and also had higher pressures at similar output rates (output rate for the blends is indicated by the nip roll setting and the film gauge). Polymer A alone required slightly more power than polymer B alone, but had lower extrusion pressures and higher pumping efficiency, as measured by pounds of polymer pumped per hour per screw revolutions/minute (RPM).

The resultant films are tested for various physical properties. Elmendorf tear is measured in accordance with ASTM D 1922; dart impact is measured in accordance with ASTM D 1709; puncture strength is measured in accordance with ASTM D 4649, with the exception that a smooth 0.5 inch puncture probe is used; tensile strength is measured in accordance with ASTM D 882; stress at 10% stretch is measured in accordance with ASTM D 882 (2% secant modulus test) except that stress at 10% stretch is recorded and crosshead speed is 20 mm/minute. The results are shown in Table 4:

TABLE 4

|  | 85% B 15% C* | 85% A 15% C | 100% A | 100% B* |
|---|---|---|---|---|
| Elmendorf tear |  |  |  |  |
| CD** gauge (mils) | 5.08 | 5.56 | 4.26 | 4.28 |
| CD tear (g) | 260 | 210 | 120 | 170 |
| MD*** gauge (mils) | 5.07 | 5.53 | 4.18 | 4.40 |
| MD tear (g) | 170 | 180 | 70 | 110 |
| Dart Impact |  |  |  |  |
| Gauge (mils) | 4.8–5.35 | 5.35–5.95 | 4.05–4.4 | 3.7–4.4 |
| Dart (g) | 740 | >1030 | >1030 | 480 |
| Puncture strength |  |  |  |  |
| Gauge (mils) | 4.96 | 5.50 | 4.18 | 4.48 |
| Energy to break (in-lbs) | 36 | 130 | 84 | 23 |
| Puncture resistance (ft-lbs/in$^3$) | 49 | 150 | 134 | 34 |
| Stress at 10% stretch |  |  |  |  |
| CD gauge (mils) | 4.58 | 4.62 | 3.79 | 4.10 |
| CD stress (MPa) | 1.50 | 1.43 | 0.98 | 0.73 |
| MD gauge (mils) | 4.92 | 4.99 | 4.29 | 3.72 |
| MD stress (MPa) | 1.32 | 1.32 | 0.91 | 0.83 |
| Tensile strength |  |  |  |  |
| CD gauge (mils) | 5.12 | 5.53 | 4.28 | 3.80 |
| CD failure load (lb) | 7 | 22 | 9 | 3 |
| CD ultimate strength (psi) | 1370 | 4060 | 2160 | 870 |
| CD elongation (%) | 890 | 800 | 760 | 860 |
| CD toughness (ft-lb/in$^3$) | 510 | 670 | 440 | 330 |
| MD gauge (mils) | 5.22 | 6.53 | 5.86 | 5.58 |
| MD failure load (lb) | 8.2 | 26 | 15 | 5 |
| MD ultimate strength (psi) | 1570 | 4030 | 2550 | 860 |
| MD elongation (%) | 750 | 770 | 620 | 730 |
| MD toughness (ft-lbs/in$^3$) | 500 | 700 | 440 | 300 |

*Comparison example
**CD = Cross direction
***MD = Machine direction

The results show that the substantially linear ethylene/-olefin polymer (polymer A) and its blend (A and C) have substantially better dart impact strength, resistance to puncture, resistance to failure load and ultimate strength, than polymer B and its blend (B and C). Polymer A and its blend also have approximately equivalent or lower propensity to stretch as indicated by 10 percent stretch and percent tensile elongation (the lower the stretch, the easier the film is to handle in post extrusion operations such as bag forming and filling) than polymer B and its blend (B and C).

Experimental: Blown Film Example

A blend of 85% (by weight of the final polymer blend) of polymer A and 15% of polymer C is made into blown film with a layflat width of 23.6 inches using a 75 horsepower Egan extruder having a 2.5 inch diameter, L/D of 24:1, DSB II screw equipped with a Maddock mixer, Sano 6 inch die, a 2.5:1 blowup ratio, a 70 mil die gap and future dual lip air ring according to the following parameters:

TABLE 5

|  | 85% A 15% C |
|---|---|
| Zone 1 (°F.) | 302 |
| Zone 2 (°F.) | 324 |
| Zone 3 (°F.) | 403 |
| Zone 4 (°F.) | 401 |
| Pipe (°F.) | 420 |
| 90 Block (°F.) | 420 |
| Die 1 (°F.) | 421 |
| Die 2 (°F.) | 420 |
| Melt temp. (°F.) | 440 |
| Line speed (ft/min) | 54 |
| Amps | 77 |
| Pressure 1 (psi) | 2940 |
| Pressure 2 (psi) | 1200 |
| Horse power | 10 |
| Film gauge (mils) | 2.36 |
| Output rate (lb/hr) | 119 |
| Layflat (in.) | 23.6 |

It is not possible to blow a similar film using the same equipment with a blend of 95 percent of polymer B and 5 percent of polymer C, since the bubble would not stabilize. Even at very low output rates, the melt strength of polymer B is so low that the bubble tears at the die or develops large holes shortly after the die which break the bubble.

Physical properties of the blown film are reported in Table 6:

TABLE 6

|  | 85% A 15% C |
|---|---|
| Elmendorf tear |  |
| CD** gauge (mils) | 4.54 |
| CD tear (g) | 4.20 |
| MD*** gauge (mils) | 4.51 |
| MD tear (g) | 100 |
| Dart Impact |  |
| Gauge (mils) | 4.4–4.6 |
| Dart (g) | >1280 |
| Puncture strength |  |
| Gauge (mils) | 5.04 |
| Energy to break (in-lbs) | >130 |
| Puncture resistance (ft-lbs/in$^3$) | >170 |
| Stress at 10% stretch |  |
| CD gauge (mils) | 4.54 |
| CD stress (MPa) | 1.36 |
| MD gauge (mils) | 4.55 |
| MD stress (MPa) | 1.29 |

TABLE 6-continued

| | 85% A 15% C |
|---|---|
| Tensile strength | |
| CD gauge (mils) | 4.71 |
| CD failure load (lb) | 15 |
| CD ultimate strength (psi) | 3100 |
| CD elongation (%) | 780 |
| CD toughness (ft-lb/in$^3$) | 590 |
| MD gauge (mils) | 4.55 |
| MD failure load (lb) | 17 |
| MD ultimate strength (psi) | 3800 |
| MD elongation (%) | 620 |
| MD toughness (ft-lbs/in$^3$) | 680 |

Compared to cast film made from the similar polymer blend, the blown film has enhanced puncture resistance, decreased MD tear resistance and about equal resistance to 10 percent stretch. Both the blown and cast film made from the blends of the substantially linear ethylene/α-olefin polymer and LDPE have dart impact resistance greater than about 1030 g.

We claim:

1. A batch inclusion package which comprises (A) an ingredient used to make an article packaged in (B) a protective film comprising at least one layer of at least one substantially linear ethylene/$C_3$–$C_{20}$ α-olefin polymer, wherein the protective film (B) becomes part of the final article comprising the ingredient and wherein the substantially linear ethylene/α-olefin polymer is characterized as having:

a) a melt flow ratio, $I_{10}/I_2$, $\geq 5.63$, b) a molecular weight distribution, $M_w/M_n$, defined by the equation: $M_w/M_n \leq (I_{10}/I_2) - 4.63$, c) a critical shear rate at onset of surface melt fracture of at least 50 percent greater than the critical shear rate at the onset of surface melt fracture of a linear ethylene/α-olefin polymer having about the same $I_2$ and $M_w/M_n$, and d) a density from about 0.87 g/cm$^3$ to 0.92 g/cm$^3$.

2. The package of claim 1 wherein the substantially linear ethylene/α-olefin polymer is further characterized as having:

e) a processing index less than or equal to about 70% of the PI of a linear ethylene/α-olefin copolymer having about the same $I_2$ and $M_w/M_n$.

3. The package of claim 1, wherein the molecular weight distribution of the substantially linear ethylene/$C_3$–$C_{20}$ α-olefin polymer is from about 1.5 to about 2.5.

4. The package of claims 1 or 3, wherein the $I_{10}/I_2$ of the substantially linear ethylene/α-olefin polymer is at least about 7.

5. The package of claims 1 or 3, wherein the $I_{10}/I_2$ of the substantially linear ethylene/α-olefin polymer is at least about 8.

6. The package of claims 1 or 3, wherein the substantially linear ethylene/α-olefin polymer is a copolymer of ethylene and a $C_3$–$C_{20}$ α-olefin.

7. The package of claims 1 or 3, wherein the substantially linear ethylene/α-olefin polymer is an interpolymer of ethylene and at least one $C_3$–$C_{20}$ α-olefin.

8. The package of claims 1 or 3, wherein the substantially linear ethylene/α-olefin polymer is a copolymer of ethylene and 1-octene.

9. The package of claims 1 or 3, wherein the substantially linear ethylene/α-olefin polymer has from about 0.01 to about 3 long chain branches/1000 carbons along the polymer backbone.

10. The package of claims 1 or 3, wherein the ingredient is a free flowing ingredient selected from the group consisting of clay, silicates, calcium carbonate, cadmium diethyldithiocarbanate, tetramethylthiuram disulfide, benzothiazyl disulfide, substituted thio esters and amine type antioxidants, aniline antiozonant derivatives, curatives, ultraviolet agents, color pigments, reinforcing pigments, processing aids and rubber processing oils.

11. The package of claims 1 or 3, wherein the protective film (B) is a monolayer film.

12. The package of claims 1 or 3, wherein the ingredient is a free flowing ingredient comprising clay.

* * * * *